Patented Feb. 7, 1950

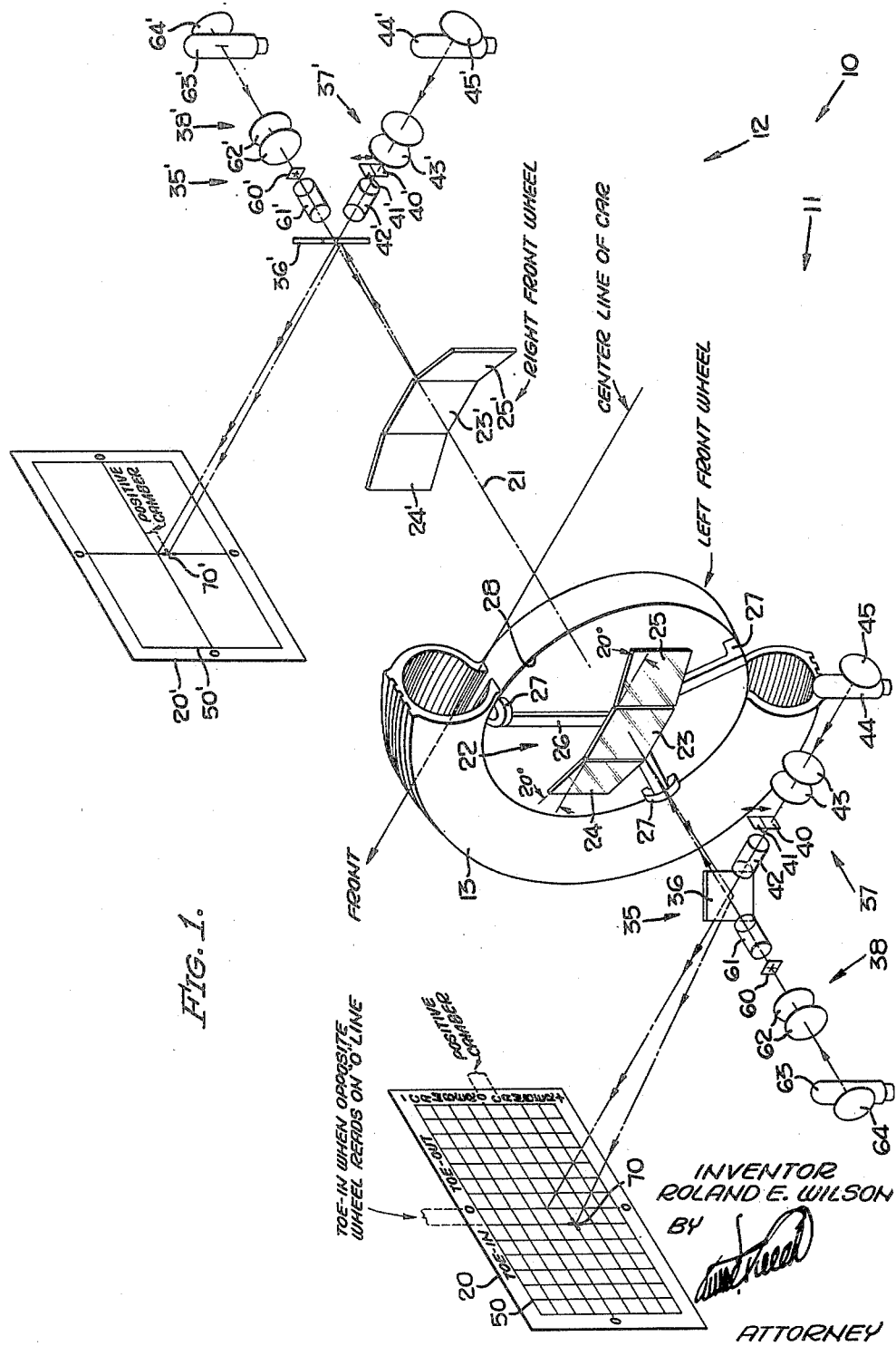

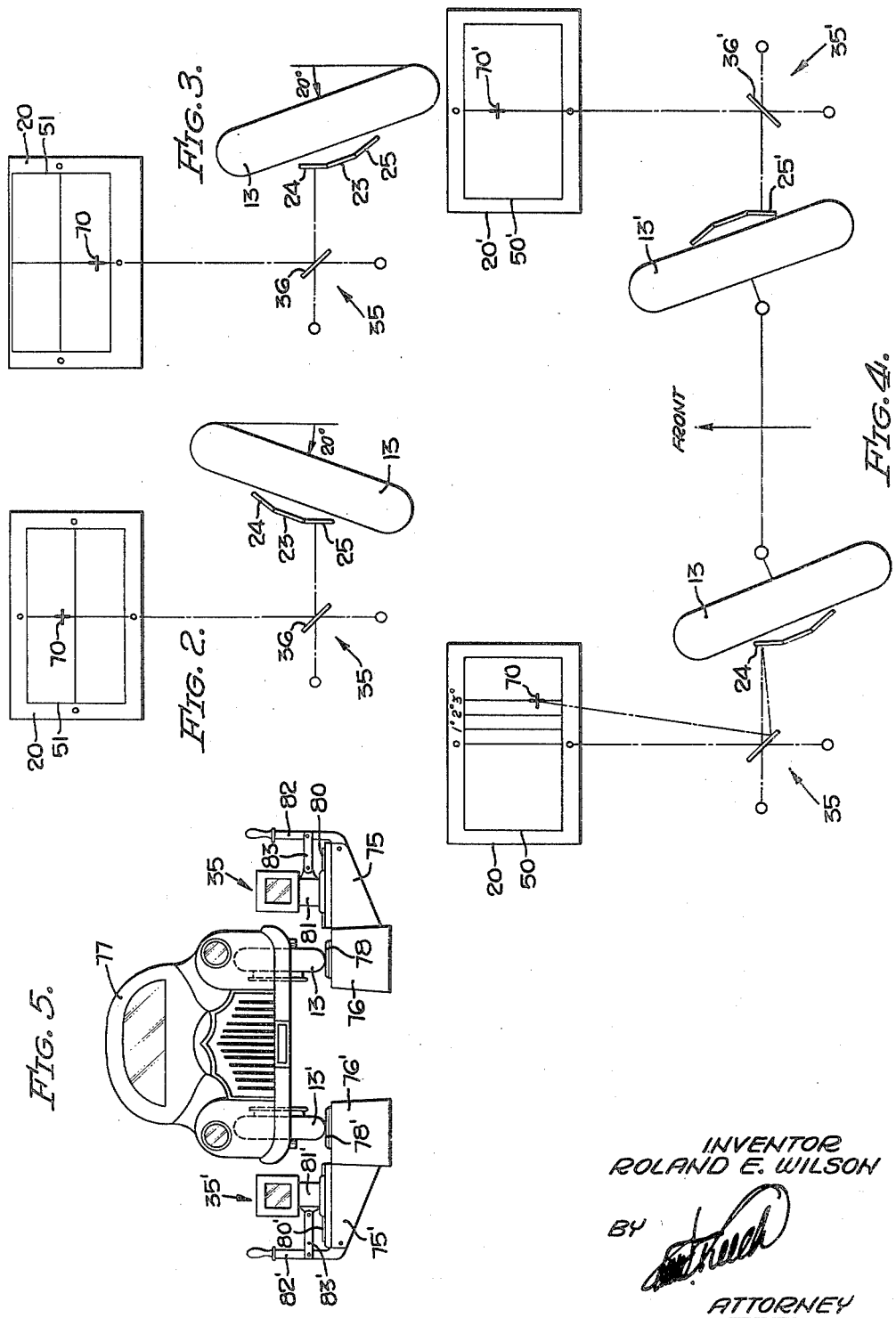

2,496,324

UNITED STATES PATENT OFFICE 2,496,324

MIRROR AND LIGHT BEAM WHEEL ALIGNMENT CHARACTERISTIC MEASURING DEVICE

Roland E. Wilson, Detroit, Mich., assignor to Food Machinery and Chemical Corporation, a corporation of Delaware Application January 5, 1945, Serial No. 571,717

18 Claims. (Cl. 88—14)

This invention relates to the art of correcting certain alignment characteristics of dirigible wheels such as camber, toe-in, toe-out, caster and king-pin inclination.

It is an object of the present invention to provide an improved apparatus for use in checking the alignment characteristics of dirigible wheels which will be relatively simple and which may be quickly operated to secure accurate results.

It is a further object of the invention to provide such an apparatus in the operation of which the readings appear where they may be read by the mechanic as he makes the corrections indicated as necessary.

It is a further object of the invention to provide an apparatus for use in checking the alignment characteristics of dirigible wheels which optically measures said characteristics.

It is yet another object of the invention to provide such an apparatus which is compact and occupies little floor space outside of that required for the automobile being tested.

A still further object of the invention is to provide such an apparatus which will produce relatively large and therefore readily legible readings of the values determined by the apparatus and the disposing of these readings in a plane located out in front of the automobile so that they may appear upon a screen disposed flat against a wall of the garage in which the apparatus is used.

It is also an object of the invention to provide such an apparatus in which a chart providing camber and toe readings appears on an imperforate surface whereby accurate readings may be accomplished in any portion of said chart and particularly in that area adjacent the intersection of vertical and horizontal zero lines thereof.

A still further object is to provide such an apparatus which will optically measure the angles of turn of a dirigible wheel about its king-pin and of the inclination of the plane of said wheel from vertical and provide simultaneous readings of said angles on a single calibrated chart disposed in a plane parallel with the axis of said wheel when the latter is turned straight ahead.

The manner of accomplishing the foregoing objects as well as further objects and advantages will be made manifest in the following description taken in connection with the accompanying drawings, in which:

Fig. 1 is a diagrammatic perspective view illustrating the apparatus of my invention.

Fig. 2 is a diagrammatic plan view illustrating the first position of the apparatus in accomplishing a reading of caster.

Fig. 3 is a view similar to Fig. 2 and illustrating the second position of the apparatus in accomplishing a reading of caster.

Fig. 4 is a diagrammatic plan view illustrating the apparatus of my invention as when employed in accomplishing a reading of toe-out on turns.

Fig. 5 is a diagrammatic front elevation of a preferred form of mounting for the optical devices of my invention and showing an automobile in position to have the alignment characteristics of the front wheels checked.

Referring specifically to the drawings and particularly to Fig. 1, it is to be noted that the apparatus 10 of my invention embraces two units, 11 and 12, these units being positioned relative to each other so that an automobile may be driven with the front wheels disposed between these units, with the left wheel 13 thereof opposite unit 11 in a relationship therewith to be checked thereby and with the right wheel correspondingly related to the unit 12.

As the units 11 and 12 are reverse duplicates of each other a description of one will suffice for both. For convenience, therefore, only the unit 11 will be described in detail and reference thereafter to unit 12 will be had by employing the characters designating corresponding parts in the unit 11 with prime attached.

The apparatus unit 11 includes an opaque projection screen 20 which is provided with a suitable stand so that it may be set up in front of and to the left of a car being tested as diagrammatically shown in Fig. 1. The screen 20 is preferably spaced about six feet in front of and parallel with the transverse car axis 21 which passes through the centers of the two front wheels being tested with said wheels turned straight ahead.

The apparatus unit 11 also includes a wheel mirror attachment 22 including a central mirror 23, a front wing mirror 24, and a rear wing mirror 25 which are mounted rigidly together and secured on a three-armed bracket 26 having magnets 27 by which the attachment 22 is temporarily secured to the metal body 28 of the wheel 13 to permit the method of the invention to be performed by the apparatus 10.

As indicated in Fig. 1, the mirrors 24 and 25 are set on the attachment 22 at angles of 20° with respect to the mirror 23. The latter mirror is so set on this attachment that it is disposed as nearly as possible parallel with the plane of the wheel 13.

The apparatus unit 11 also has an optical device or system 35 which includes a semi-transparent mirror 36, a chart image projector 37, and an indicator image projector 38. The optical axis of the projector 38 approximately coincides with the transverse axis 21 of the front wheels being tested. The optical axis of the projector 37 lies in the same horizontal plane with and is disposed at right angles to the optical axis of the projector 38.

The semi-transparent mirror 36 is disposed vertically with a silvered surface thereof in a plane passing through the point of intersection between the optical axes of the projectors 37 and 38, and is angled at 45° from each of these axes. The semi-transparent mirror 36 is so placed that light beams proceeding from either of the projectors 37 or 38 may pass through this mirror with a minimum of interference with their passage. Light rays impinging against the opposite side of the mirror, however, are almost entirely reflected therefrom.

The projector 37 includes a vertically movable camber chart film 40 having a caster chart film 41 united with its upper edge, movable projection lenses 42, condenser lenses 43, a projection bulb 44 and a mirror reflector 45.

When the projection bulb 44 is energized, the projector 37 throws a beam of light through the semi-transparent mirror 36 and onto the screen 20. This beam of light passes through either the camber chart film 40 or the caster chart film 41 depending upon the vertical positioning of these films. Fig. 1 shows the film 40 interposed in the path of this beam of light so that a camber chart image 50 is projected upon the screen 20. This chart has horizontal and vertical "0" lines which intersect at the optical axis of the projector 37. Calibrated graduation lines are also provided for measuring camber or toe-out or toe-in in degrees, as will be made clear hereinafter.

A line in Fig. 1 indicating the axis of the beam of light thrown by the projector 37 and of the chart image 50 cast thereby on screen 20 is identified by double arrowheads formed thereon.

The projector 38 includes a fixed cross-hair film 60, movable projection lenses 61, condenser lenses 62, a projection bulb 63, and a mirror reflector 64. The projector 38 throws a beam of light in the shape of a cross-hair determined by a light opening in the film 60, along the axis 21, so that this passes through the semi-transparent mirror 36 and impinges on the mirror 23 when the wheel 13 is turned substantially straight ahead. This beam of light is indicated in Fig. 1 by a line with single arrowheads thereon which shows how it is reflected from the mirror 23, impinges against the reflecting surface of the mirror 36, and is reflected thereby onto the screen 20 to form an indicator image 70.

As shown in Fig. 5 I prefer to mount optical devices 35 and 35' on brackets 75 and 75' provided on rigid parallel tracks 76 and 76' upon which an automobile 77 to be tested may be driven so the front wheels thereof rest individually upon turntables 78 and 78' on said tracks.

Considering these wheels as identical with the wheels 13 and 13' referred to in describing Fig. 1, it is to be noted that approximate coincidence of the axis 21 of these wheels with the optical axes of projectors 38 and 38' is accomplished by manipulation of the automobile 77 on the tracks 76 and 76'.

The brackets 75 and 75' have horizontal upper surfaces and slide tracks 80 and 80' which bases 81 and 81' of the devices 35 and 35' slidably fit so these devices are guided thereby for movement parallel with the optical axis of projectors 38 and 38'.

Pivoted on brackets 75 and 75' are hand levers 82 and 82' which are connected by links 83 and 83' to the bases 81 and 81'. These levers are thus adapted for shifting the devices 35 and 35' towards and away from the wheels 13 and 13' and the mirrors carried thereon.

Operation

With car 77 positioned on the tracks 76—76' as indicated, and the wheel mirrors attached to wheels 13 and 13' as already described, with the upper edges of mirrors 23 and 23' level, and with the wheels directed as when travelling straight forward, the devices 35 and 35' are shifted by the levers 82—82' so as to be located the standard normal distance respectively from said mirrors. In practice 10 inches has been adopted for this distance. This is thus seen to be a very short distance compared to the 72 inches which the screen 20 is spaced from the axis 21.

This distance must be uniform and the chart films 40—41 and 40'—41' scaled accordingly so that the charts thrown onto screens 20 and 20' will properly measure the various alignment characteristics indicated by the indicator images 70 and 70'.

Consideration must also be given in scaling the chart films, to the distance which the screens 20—20' are spaced from the axis 21 unless the focusing lenses 42—42' are spaced from their respective semi-transparent mirrors 36—36' the same distance which the mirrors 23—23' are spaced respectively from the optical axes of projectors 37—37'.

If this condition exists and a proper scale is accomplished by focusing chart images on screens 20—20' at a given distance from the optical axes of devices 38—38', then a proper measurement of alignment characteristics will exist no matter how far the screens 20—20' are spaced from devices 35—35' when the chart and indicator images are focused on these screens.

Assuming that the screens 20—20' are properly spaced from the devices 35—35', or that a universal condition exists as noted, we are now ready to check the camber, toe-in, toe-out, caster, and king-pin inclination of the wheels 13 and 13'.

The projection bulbs of the optical devices 35 and 35' are now illuminated so as to project chart images and indicator images on the screens 20 and 20'. The steering mechanism is then manipulated so as to turn the right wheel to where the indicator image 70' is on the vertical zero line of the chart image 50'. The light beam from the projector 38' is now perpendicular to a horizontal line lying in the reflecting face of the wheel mirror 23' and intersecting said beam. The indicator images 70 and 70' now indicate the camber of the left and right wheels respectively and the indicator image 70 also indicates on the chart 50 the toe-in angle between the two wheels.

The vertical and horizontal graduation lines provided on the charts 50 and 50' shown in Fig. 1 now give the camber and toe-in angles in degrees when read by the positions of the indicator images 70 and 70' on these chart images.

The caster of each wheel is checked independently of that of the other and for illustrative purposes a checking of the caster of the left wheel 13 will now be described.

The first step in this method is to shift the chart films 40—41 to remove film 40 and substitute film 41 therefor in projecting position in projector 37. Then turn the wheel 13 about its king-pin until the plane of the wheel is turned as shown in Fig. 2, inward 20° from the straight ahead position. When the wheel is thus turned and the projection bulbs 44 and 63 of the unit 11 energized, a caster chart image 51 will be projected on the screen 20. This chart has vertical and horizontal zero lines and calibrations (not shown) so that readings of caster may be made directly from the position of the indicator image 70 on this chart.

The film 41 is now adjusted vertically so as to bring the horizontal zero line in register with the indicator image 70. The wheel 13 is now swung about its king-pin to the position shown in Fig. 3 in which it is turned outward 20° from straight ahead position. The light beam thrown by the projector 38 now impinges against the mirror 24 from which it is reflected against the semi-transparent mirror 36 and thence onto the screen 20. The position of the indicator image 70 on the caster chart image 51, and particularly the distance which this lies above or below the zero line, gives a direct reading from the calibrations of the caster chart of the amount of caster of the wheel 13.

The caster of the right wheel of the car being tested is checked by identically the same process as just described for the wheel 13, although using for this the apparatus unit 12.

As shown in Figs. 2 and 3 the reflected beam falls on the screen 20 to produce an indicator image 70 on the vertical zero line of the caster chart 51 with the wheel 13 in each of its inturned and outturned positions for measuring caster as shown in these views.

It may be stated as a generality that whenever one of the front wheels is positioned so that one of the mirrors mounted thereon is positioned so that the reflecting face thereof receives the projected light beam of the adjacent optical system, whereby said projected beam is reflected from said mirror face onto the mirror 36 and deflected by the latter onto the screen associated therewith so that it falls upon the vertical zero line of the chart projected on said screen, said projected beam is now perpendicular to the horizontal line which intersects said beam and lies in the plane of said wheel mirror reflecting face.

This fact eliminates the necessity for any other means for measuring the angular positions of the wheels 13 and 13' about their respective kingpins in order to place one of these wheels in a proper measuring position as is necessary for the measurement of one or more of the alignment characteristics thereof by the apparatus 10.

The wheel mirrors mounted on each wheel are so related to the plane of that wheel in order to turn said wheel straight ahead, or in order to turn it inwardly exactly 20° or outwardly exactly 20° (these three positions being hereinafter referred to as alignment characteristic measuring positions) it is only necessary to turn the wheel to where the light beam of the optical system associated therewith impinges upon the particular wheel mirror to be employed in connection with that particular wheel position and then make whatever adjustment is necessary by turning said wheel about its king-pin to bring the indicator image 70 on the screen of said system on the vertical zero line of the chart projected on said screen in order to know that the wheel is now in that particular desired measuring position.

To check toe-out of the two front wheels of the car, the optical devices 35 and 35' are energized, and the films 40 and 40' placed in the projectors 37 and 37', which form the charts 50 and 50' shown in Fig. 1.

The front wheels are then turned as shown in Fig. 4 so that one of these, in this case the right wheel, is toed-in at an angle of 20° from straight ahead. This will bring mirror 25' opposite the light beam cast by the projector 38', and the indicator image 70' cast on the screen 20' by this beam will be located on the vertical zero chart line as shown in Fig. 4.

With the apparatus 10 thus set up and in operation, the toe-out of the left front wheel may be read by the location of the indicator image 70 with respect to the toe-out calibrations provided in chart image 50.

A reading of king-pin inclination may be accomplished by my invention in the following manner. After getting the upper and lower caster indicator images as shown in Figs. 2 and 3, the amount of caster in degrees is noted. Holding a pointer on the screen at the midpoint between the two locations of the indicator image in measuring caster, the wheel is turned back to straight ahead position. The distance now between the pointer and the indicator image is a measure of the king-pin inclination of this wheel and the latter can be ascertained in degrees by applying a suitably calibrated scale to the screen to measure this distance on said scale.

While I have shown the apparatus of my invention diagrammatically and confined myself to the disclosure of a single embodiment of the same, it is to be understood that various modifications may be made in this as well as in the method disclosed without departing from the spirit of the invention or the scope of the appended claims.

I claim:

1. An apparatus for measuring an alignment characteristic of one of a pair of dirigible wheels, which comprises: a mirror fastened on said wheel and facing laterally therefrom; a projection base mounted for rectilinear movement towards and away from said mirror in a direction approximately parallel with the line passing through the centers of said wheels, with said wheels turned straight ahead; a screen disposed parallel with said direction and thus spaced a constant distance from said base; means on said base for projecting a chart on said screen along an axis having a fixed orientation relative to said direction; means on said base for projecting a beam of light against said mirror with a fixed orientation relative to said direction; and a mirror on said base for deflecting the reflected beam onto said screen to form an indicator image on said screen, said chart embodying calibrations so that when said base is shifted in said direction into a given spaced relation with said wheel mirror, and said wheel is turned to have a given angular relation with said line, the location of said indicator image on said screen, with reference to the calibrations on said chart, indicates quantitatively the amount of said alignment characteristic.

2. An apparatus for measuring caster of a king-pin mounted dirigible wheel of an automobile, which comprises: an optical device mounted independently of said wheel, said device including means for projecting a beam of light inwardly toward said wheel, a mirror means on a mounting device, mounted when in use in upright position on said wheel, said mirror means being mounted to present to said beam, in each of two different positions of said wheel turned equally in opposite directions from straight ahead, a plane reflective mirror face reflecting said beam outwardly away from said wheel, said mirror face being positioned to intercept said beam for each of said two positions of said wheel, with substantially the same angular relation between said beam and the horizontal line in said face intercepting said beam; a screen disposed to intercept said beam to form an indicator image on said screen after said beam has been reflected from said mirror face in each of said two positions of said wheel and means providing a chart on said screen, said chart having calibrations which provide a reading thereon of the caster of said wheel by the difference vertically between the locations of said indicator images on said chart when said wheel is placed successively in said two positions.

3. An apparatus for measuring caster of a king-pin mounted dirigible wheel of an automobile, which comprises: an optical device mounted independently of said wheel, said device including means for projecting a beam of light inwardly toward said wheel; a mirror means on a mounting device, mounted when in use in an upright position on said wheel, said mirror means being mounted to present to said beam, in each of two different positions of said wheel turned equally in opposite directions from straight ahead, a plane reflective mirror face reflecting said beam outwardly away from said wheel, said mirror face being positioned to intercept said beam for each of said two positions of said wheel, with substantially the same angular relation between said beam and the horizontal line in said face intercepted by said beam; a screen disposed to intercept said beam to form an indicator image on said screen after said beam has been reflected from said mirror face in each of said two positions of said wheel, and means providing a chart on said screen, said chart having calibrations which provide a reading thereon of the caster of said wheel by the difference vertically between the locations of said indicator images on said chart when said wheel is placed successively in said two positions, said chart having a vertical line on which said image falls in each of said two locations.

4. An apparatus for measuring caster of a king-pin mounted dirigible wheel of an automobile, which comprises: an optical device mounted independently of said wheel, said device including means for projecting a beam of light inwardly toward said wheel; a mirror means on a mounting device, mounted when in use in an upright position on said wheel, said mirror means being mounted to present to said beam, in each of two different positions of said wheel turned equally in opposite directions from straight ahead, a plane reflective mirror face reflecting said beam outwardly away from said wheel, said mirror face being positioned to intercept said beam for each of said two positions of said wheel, with substantially the same angular relation between said beam and the horizontal line in said face intercepted by said beam; a screen disposed to intercept said beam to form an indicator image on said screen after said beam has been reflected from said mirror face in each of said two positions of said wheel, and means providing a chart on said screen, said chart having calibrations which provide a reading thereon of the caster of said wheel by the difference vertically between the locations of said indicator images on said chart when said wheel is placed successively in said two positions, said chart having a horizontal zero line and means for vertically shifting said chart to bring said horizontal zero line into coincidence with said indicator image when said wheel is in one of said positions so that when said wheel is turned to the other of said positions the vertical location of said image with reference to said horizontal line provides a direct reading of said caster.

5. An apparatus for measuring caster of a king-pin mounted dirigible wheel of an automobile which comprises: an optical device mounted independently of said wheel, said device including means for projecting a beam of light inwardly toward said wheel, a mirror means on a mounting device mounted when in use in upright position on said wheel, said mirror means being mounted to present a plane reflective mirror face at each of two different angles with the plane of the wheel, the face presented at one of said angles intercepting said beam with said wheel disposed in one of two positions in which said wheel is turned the same amount in opposite directions from straight ahead, the reflective mirror face presented at the other of said angles intercepting said beam when the wheel is in the other of said turned positions, said angles being such that the same angular relation exists between said beam and the horizontal line in the reflective mirror face intercepting said beam with said wheel in each of said positions, a screen disposed to intercept said beam, to form an indicator image thereon, after it has been reflected from a reflective mirror face with said wheel in each of said two positions, and means providing a chart on said screen having calibrations which provide a reading thereon of the caster of said wheel by the difference vertically between the locations of the indicator images on said chart when said wheel is placed successively in said two positions.

6. An apparatus for measuring caster of a king-pin mounted dirigible wheel of an automobile which comprises: an optical device mounted independently of said wheel, said device including means for projecting a beam of light inwardly toward said wheel, a mirror means on a mounting device mounted when in use on said wheel, said mirror means including two separate plane mirror faces which face outwardly and are angled inwardly from each other and towards the plane of the wheel, one of said plane mirror faces intercepting said beam with said wheel disposed in a particular one of two positions of said wheel in which positions said wheel is turned the same amount in opposite directions from straight ahead, the other of said plane mirror faces intercepting said beam when the wheel is in the other of said turned positions, said separate plane mirror faces being angled relative to the plane of the wheel to produce the same angular relation between said beam and the horizontal line intersecting said beam and lying in the mirror face intercepting said beam with said wheel in each of said positions, a screen disposed to intercept said beam to form an indicator image thereon after it has been reflected from said mirror faces with said wheel in said two positions, and means providing a chart on said screen having calibrations which provide a reading thereon of the caster of said wheel by the difference vertically between the locations of the indicator images on said chart when said wheel is placed successively in said two positions.

7. An apparatus for measuring the camber and caster of a king-pin mounted dirigible wheel of an automobile which comprises: an optical device mounted independently of said wheel, said device including means for projecting a beam of light inwardly towards said wheel, a mirror means on a mounting device mounted when in use on said wheel, said mirror means including a middle mirror parallel to the plane of the wheel and two wing mirrors inclined inwardly and away from said middle mirror, said middle mirror intercepting said beam of light with the wheel directed straight ahead, one of said wing mirrors intercepting said beam of light when the wheel is turned a particular amount in one direction from straight ahead and the other wing mirror intercepting said beam when the wheel is turned an equal amount in the opposite direction from straight ahead, said beam having, with said wheel in each of said turned positions, substantially the same angular relation with the horizontal line which is intersected by said beam and lies in the face of the wing mirror intercepting said beam, a screen disposed to intercept said beam to form an indicator image thereon after said beam has been reflected by said mirror faces, means providing camber and caster charts on said screen, said camber chart having calibrations providing a reading of the camber of said wheel from the position in which said indicator image is projected on said screen from said middle mirror, and said caster chart having calibrations thereon providing a reading of the caster of said wheel from the vertical spacing between the positions in which said indicator image is projected on said screen from said wing mirrors with said wheel turned successively in different directions from straight ahead as aforesaid.

8. An apparatus for measuring an alignment characteristic of one of a pair of dirigible king-pin mounted wheels of an automobile which comprises: a mirror mounted on said wheel when in use and facing laterally therefrom; an optical system disposed alongside said automobile and mounted independently thereof close to said wheel mirror, said system including a deflecting mirror and a light source for directing a beam of light inwardly against said wheel mirror, the reflected beam impinging upon said deflecting mirror and being deflected thereby alongside said automobile; a screen interposed in the path of said deflected beam to form an indicator image thereon; and means providing a chart on said screen, with said indicator image falling on said chart when said wheel is turned about its king-pin to a given measuring position, said chart having calibrations which provide a reading of said alignment characteristic by virtue of the location on said chart of said indicator image.

9. An apparatus as in claim 8 in which the deflecting mirror is a beam dividing mirror interposed in the path of the beam between said light source and said wheel mirror.

10. An apparatus as in claim 8 in which said chart providing means comprises a projector which is included in said optical system and projects said chart on said screen and in which the optical system has means for mounting it on a base rectilinearly movable to and from said wheel.

11. An apparatus for measuring alignment of a king-pin mounted dirigible automobile wheel which comprises: a mirror mounted when in use, on said wheel to face laterally therefrom; a screen; an optical system mounted independently of said wheel and disposed laterally therefrom, said system including a beam divider, a light projector for projecting a beam through said divider and against said wheel mirror, the beam reflected from said wheel mirror being deflected by said beam divider onto said screen to form an indicator image thereon, said optical system also including a chart projector projecting a chart through said beam divider onto said screen, the axes of projection of said beam and said chart intersecting substantially in the reflecting face of said beam divider, said chart having calibrations providing a reading of the alignment characteristics by the location of said indicator image on said chart.

12. An apparatus as in claim 11 in which the optical system has means for mounting it for rectilinear movement toward and away from said wheel mirror.

13. An apparatus as in claim 8 in which said beam is directed along a line which is substantially horizontal and in the vertical plane containing the axis of said wheel when the latter is turned straight ahead, in which said optical system has means for mounting it on a base rectilinearly movable to and from said wheel in a direction parallel with said plane, in which said optical system includes a projector for projecting said chart on said screen, and in which said screen is disposed substantially parallel with said plane.

14. An apparatus for measuring alignment characteristics of a dirigible king-pin mounted wheel of an automobile, which comprises: a mirror mounted on said wheel when in use in parallel relation with the plane of said wheel and facing laterally therefrom, an optical device mounted independently of said wheel, said device including means for projecting a beam of light inwardly towards said wheel and against said mirror, a deflector provided on said optical device for intercepting the reflection of said beam from said wheel mirror and diverting said reflected beam from its path by a substantial angle, an imperforate screen disposed to intercept said deflected reflection of said beam, and means providing a chart on said screen having horizontal and vertical zero reference lines upon the intersection of which said deflected reflected beam would impinge when said wheel is turned straight ahead and has no camber.

15. An apparatus as in claim 5 in which said optical device includes a deflector which is interposed in the path of reflections of said beam from a reflective mirror face to divert said reflected beam from its path by a substantial angle and direct said reflected beam onto said screen, the calibrations of said chart including horizontal and vertical reference lines, said screen being imperforate thereby permitting accurate measurements of caster on said chart adjacent the intersection of said reference lines.

16. An apparatus for measuring caster of a king-pin mounted dirigible wheel of an automobile which comprises: an optical device mounted independently of said wheel, on a base rectilinearly movable to and from said wheel, said device including means for projecting a beam of light inwardly towards said wheel; a mirror means on a mounting device mounted when in use in upright position on said wheel, said mirror means including a plane reflective mirror face at each of two different angles with the plane of the wheel, said mirror face in one angle to said wheel reflecting said beam with said wheel disposed in one of two positions in which the wheel is turned at equal angles from straight ahead, said mirror face in the other angle to said wheel reflecting the beam when the wheel is disposed in the other of said positions; a mirror on said optical device for deflecting the reflected beam; a screen disposed to intercept the beam as deflected from said deflecting mirror to form an indicator image on said screen; and a projector included in said optical device for projecting a chart on said screen, said chart having calibrations which provide a reading of caster of said wheel by the difference vertically between the locations of the indicator images formed successively on said chart when said wheel is placed successively in said two positions.

17. An apparatus for measuring the camber and caster of a king-pin mounted dirigible wheel of an automobile which comprises: an optical device mounted independently of said wheel, said device including means for projecting a beam of light inwardly towards said wheel; a mirror means on a mounting device, mounted when in use on said wheel, said mirror means including a plane reflective mirror face parallel with the plane of said wheel, and at each of two different angles with the plane of the wheel, said mirror face parallel with the plane of said wheel reflecting said beam with said wheel turned straight ahead, said mirror face in one angle to said wheel reflecting said beam with said wheel disposed in one of two positions in which the wheel is turned at given equal angles in opposite directions from straight ahead, said mirror face, in the other angle to said wheel, reflecting the beam when the wheel is disposed in the other of said positions; a screen; and means for successively superimposing camber and caster charts upon the same field of said screen, said screen being disposed to intercept said beam to form an indicator image thereon within said field after said beam has been reflected by a mirror face as aforesaid, said camber chart having calibrations providing a reading of the camber of said wheel from the position in which said indicator image is projected on said screen from a mirror face as aforesaid with said wheel turned straight ahead, and said caster chart having calibrations thereon providing a reading of the caster of said wheel from the vertical spacing between the positions in which said indicator image is projected on said screen from a mirror face as aforesaid, with said wheel turned successively in opposite directions from straight ahead.

18. An apparatus for measuring the camber and caster of a king-pin mounted dirigible wheel of an automobile which comprises: an optical device mounted independently of said wheel, on a base rectilinearly movable to and from said wheel, said device including means for projecting a beam of light inwardly towards said wheel; a mirror means on a mounting device, mounted when in use on said wheel, said mirror means including a plane reflective mirror face parallel with the plane of said wheel, and at each of two different angles with the plane of the wheel, said mirror face parallel with the plane of said wheel reflecting said beam with said wheel turned straight ahead, said mirror face in one angle to said wheel reflecting said beam with said wheel disposed in one of two positions in which the wheel is turned at given equal angles in opposite directions from straight ahead, said mirror face in the other angle to said wheel reflecting the beam when the wheel is disposed in the other of said turned positions; a mirror on said optical device for deflecting the reflected beam; a screen disposed to intercept upon a given field thereof the beam as deflected from said deflecting mirror to form an indicator image on said screen; and a projector included in said optical device for successively projecting camber and caster charts to superimpose one of these at a time upon said given field of said screen, said camber chart having calibrations providing a reading of the camber of said wheel from the position in which said indicator image is projected on said screen as aforesaid with said wheel turned straight ahead, and said caster chart having calibrations thereon providing a reading of the caster of said wheel from the vertical spacing between the positions in which said indicator image is projected on said screen as aforesaid, with said wheel turned successively in opposite directions from straight ahead.

ROLAND E. WILSON.

REFERENCES CITED

The following references are of record in the file of this patent:

UNITED STATES PATENTS

| Number | Name | Date |
| --- | --- | --- |
| 438,300 | Edison | Oct. 14, 1890 |
| 1,949,067 | Wheelock et al. | Feb. 27, 1934 |
| 2,292,968 | Peters | Aug. 11, 1942 |
| 2,410,339 | Creagmile | Oct. 29, 1946 |